Figure 1:
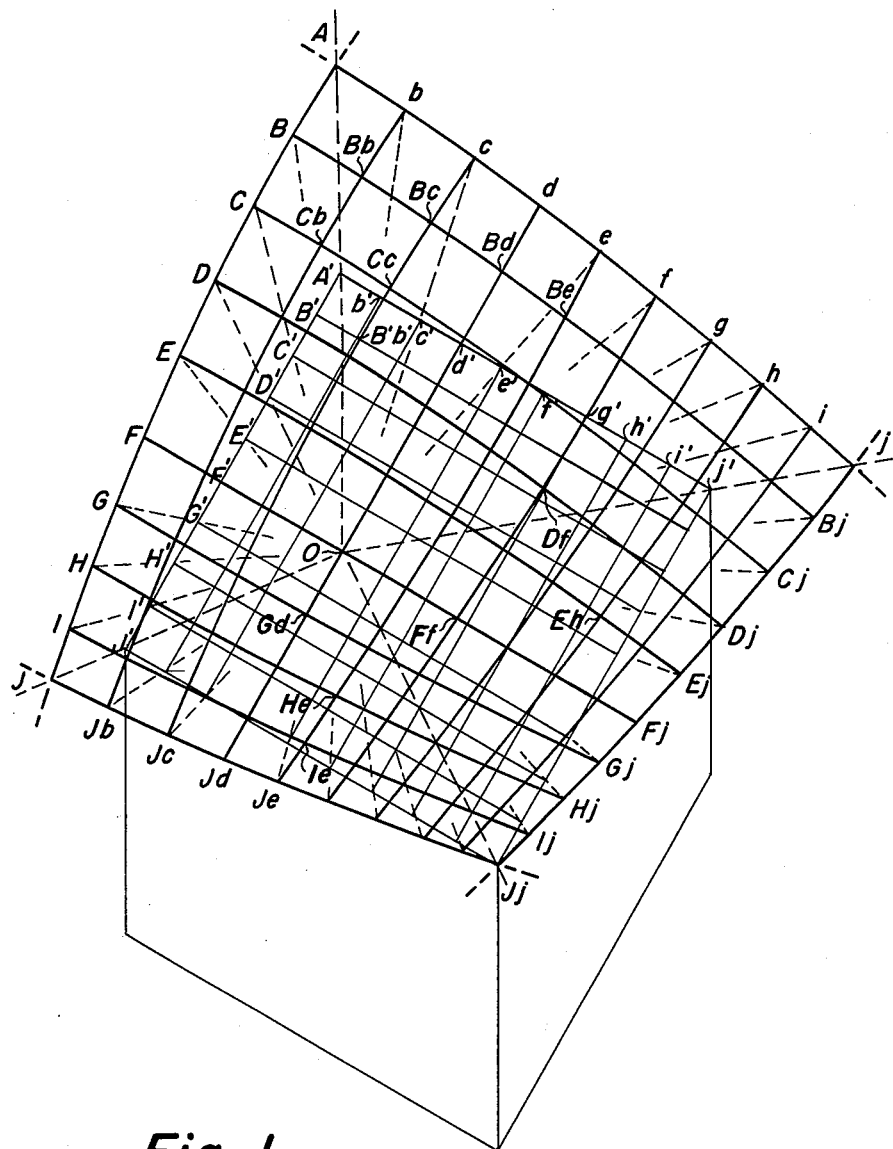

INVENTOR.
Graeme McGowan

Feb. 19, 1963　　　G. McGOWAN　　　3,077,702
STRUTLESS DOMES

Filed April 25, 1960　　　　　　　　　5 Sheets-Sheet 2

INVENTOR.
Graeme McGowan
BY Roy H. Smith, Jr.
Attorney

INVENTOR.
Graeme McGowan
BY Roy H. Smith, Jr.
Attorney

Feb. 19, 1963
G. McGOWAN
3,077,702
STRUTLESS DOMES
Filed April 25, 1960
5 Sheets-Sheet 4
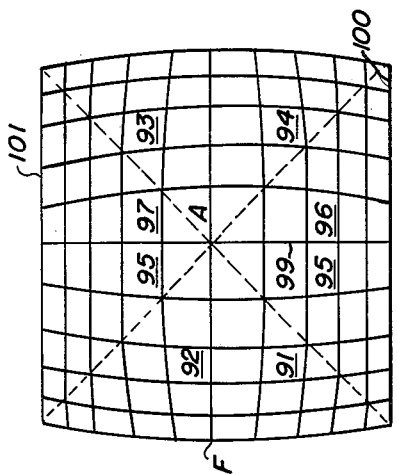
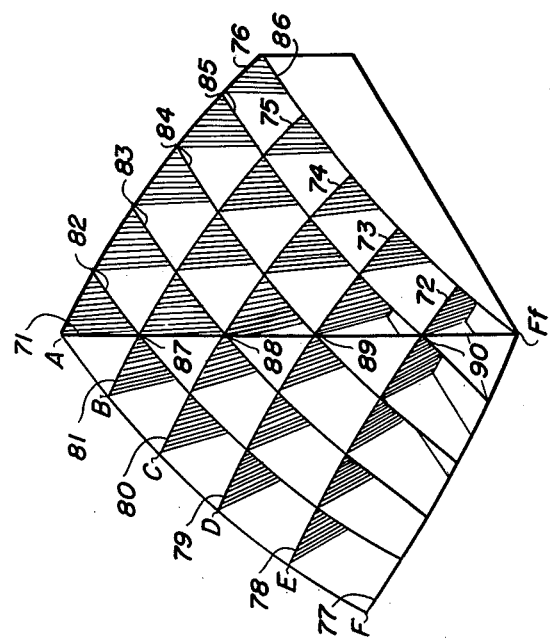
INVENTOR.
Graeme McGowan
BY Roy H. Smith, Jr.
Attorney

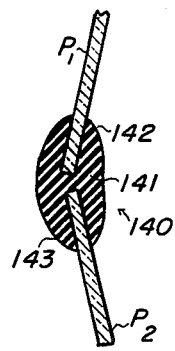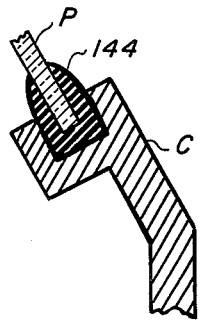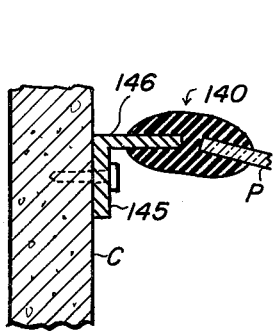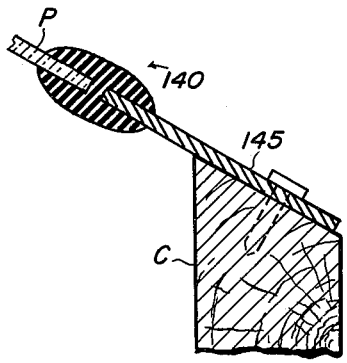
*Fig. 7*

United States Patent Office 3,077,702
Patented Feb. 19, 1963

3,077,702
STRUTLESS DOMES
Graeme McGowan, 801 N. Market St., Cortez, Colo.
Filed Apr. 25, 1960, Ser. No. 24,612
13 Claims. (Cl. 50—52)

My invention relates to various types of domes, including the generally spherical dome and spheroidal domes used to enclose areas longer in one dimension than the other.

My invention is distinguishable from prior art domes in three respects. First, it does not require the use of trusses, braces or struts, my shell of interconnected panels being completely self-supporting under both static and live load conditions. Second, the panels which form my dome shells are interconnected by joints of elastic materials, in contrast to the rigid joints of the prior art. Third, my domes are based on the simplest of all regular polyhedra, the cube, and are thus peculiarly useful in covering square and rectangular surface areas and in joining conventional box-type buildings.

Definitions

As used herein, I intend the following words to have the meanings indicated:

Geodesic plane or great circle plane—any plane passing through the center of a sphere.

Geodesic line, great circle or great circle line—any intersection of a geodesic plane and the surface of the sphere.

Lesser plane—any plane intersecting a sphere but not passing through its center.

Lesser circle or lesser circle line—any intersection of a lesser plane and the surface of the sphere.

Rigid panel—material of a flat or sheet nature, possessing compressive, tensile and bending strength, and subject to limited distortion under stresses of compression, tension or bending.

Elastic material—material of a rubbery consistency which will stretch, compress or bend within reasonable limits but possessing limits of stretch or compression and with measurable strength under tension, sheer and compression.

At the time such classical domes as that in St. Peter's Cathedral were erected, the lack of materials having more than a minimal tensile strength forced designers of that era to rely wholly on compressive strength to hold their structures together, with the result that such structures included tremendously large dead weights. With the development of many materials of high tensile strength since that time and the plentiful supply of such materials today, designers are more and more relying on tensile forces and are consequently developing lighter and lighter structures.

Domes of the recent prior art may be classified in two general groups, those utilizing a system of arches or struts radiating from the center or peak of the dome to its perimeter, and those utilizing struts following various geodesic lines projected from straight line shapes. The former have the disadvantage that all forces are transmitted directly to the perimeter. The latter, or deodesic domes, tend to dissipate live loads in all directions from any point and therefore offer greater promise of minimizing dead weight and maximizing size.

However, such prior art geodesic domes have two practical limitations. First, they have been developed from triangular, pentagonal and hexagonal planes, resulting in domes intractable in covering rectangular areas and joining conventional buildings. Second, they are dependent for support on a system of arches and purlins, or struts or braces, to support the shell or skin.

In the embodiments of my invention, on the other hand, there are no arches, struts, trusses, or equivalent structure, the entire dome being a self-supporting shell of rigid panels secured to each other and a peripheral support by joints of elastic materials. Also, my domes are projected from the simple cube, a fact which makes design calculations quite simple and, more importantly, makes my domes amenable to joining with the vertical walls of conventional buildings and to covering square and rectangular patches of surface area as well as circular areas.

To better understand my invention, a number of drawings are attached to and hereby incorporated in this specification, in which drawings:

FIGURE 1 illustrates the method of laying out and developing my basic geodesic dome on the surface of a sphere circumscribing a cube, a method involving the projection of geodesic planes passing through orthogonal grid patterns on the faces of the cube to intersect the spherical surface along geodesic lines, thus establishing a control for determining the dimensions and angles of the rigid panels, a system resulting in what I shall variously refer to hereinafter as my "basic dome," or "geodesic dome,"

Figure 3:
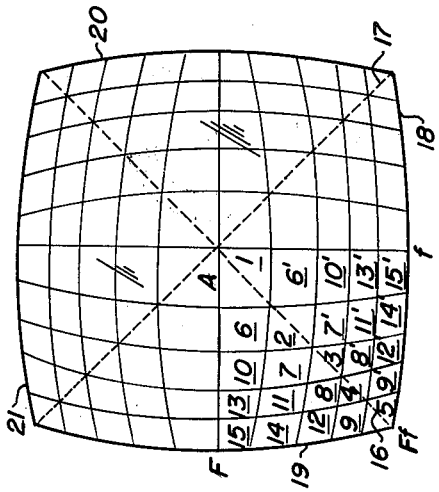
Figure 2:
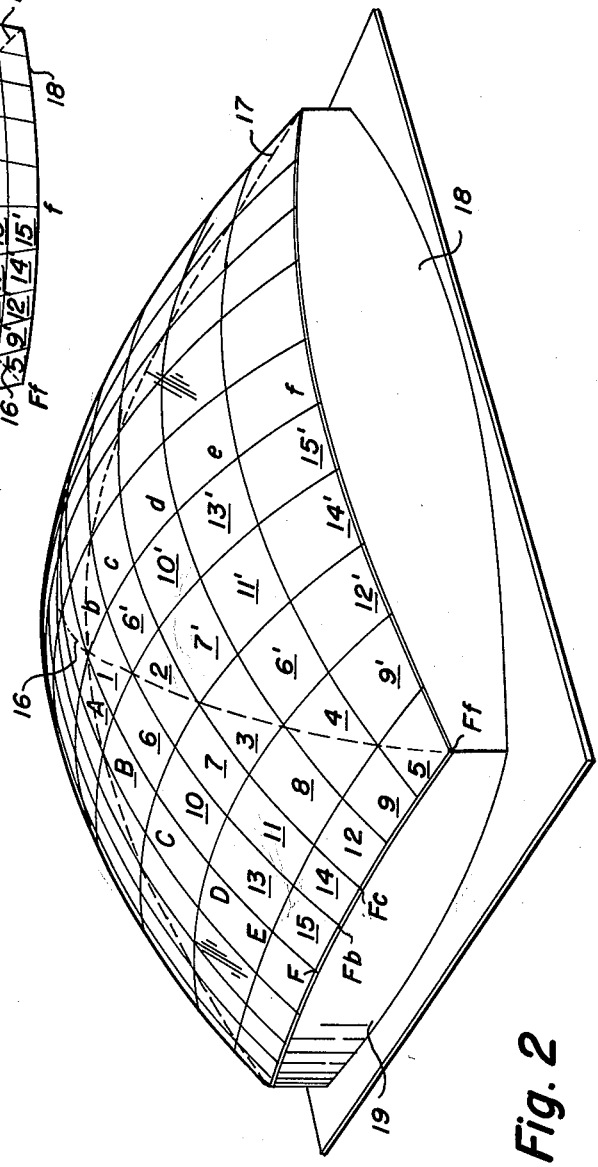
Figure 4:
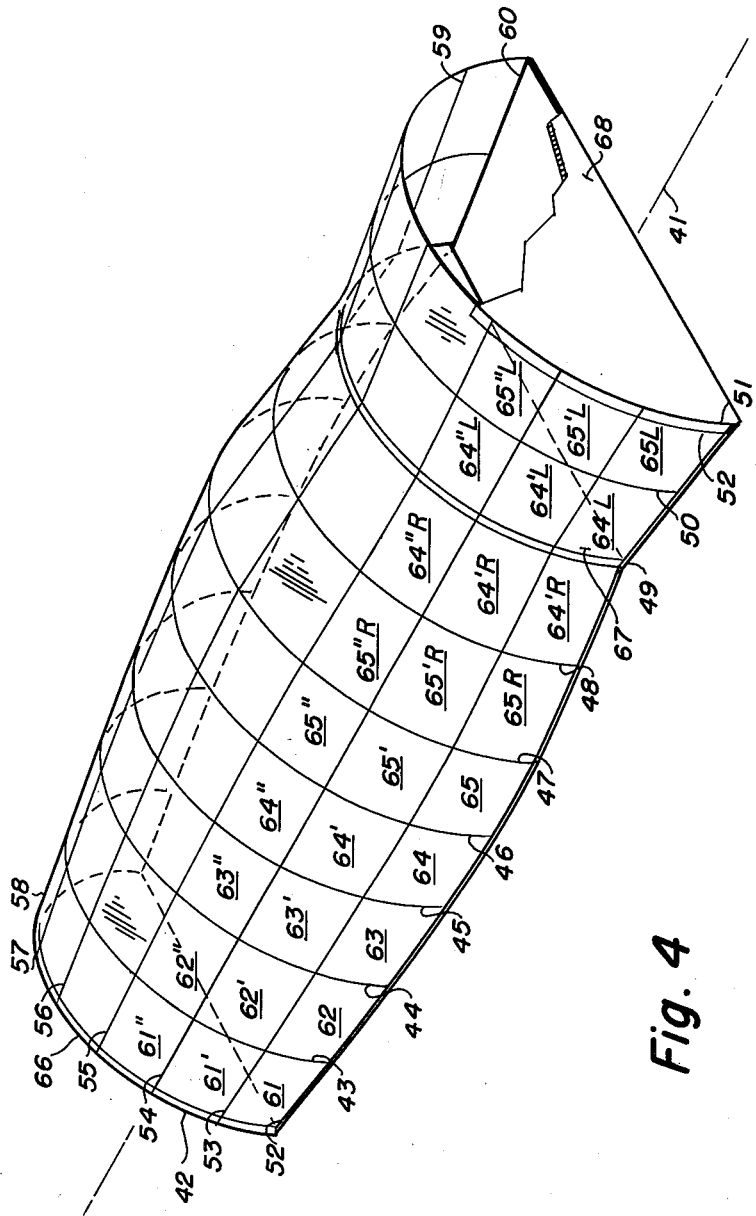

FIGURE 2 is a perspective view of my basic dome constructed according to FIGURE 1 to embrace an included angle of 90 degrees, complete with panel joints and a raised curbing, and with diagonals phantomed in, FIGURE 3 is a plan view of the FIGURE 2 embodiment reduced in size and added largely for the purpose of indicating the closeness with which the FIGURE 2 embodiment, covering an included angle of 90 degrees as illustrated, approximately covers a square surface area, FIGURE 4 illustrates a proloid or "barrel dome" modification of my invention, specifically useful where the area to be enclosed is severely elongated, sometimes hereinafter referred to as my "basic barrel" dome, FIGURE 5 illustrates in a perspective view the joining of a basic dome section to what I call a "special barrel section," the latter being particularly useful in joining basic dome sections or barrel sections to vertical walls, FIGURE 6 shows a complete dome formed of a combination of basic dome sections (octants) and special barrel sections (octants) joined to form a spherical dome with a pair of opposed "plumb" or flat vertical curbings, this embodiment being particularly useful in covering a square surface area without overlap along the opposed straight edges and FIGURE 7 illustrates the preferred and optinal methods of joining the panels of the present invention to one another and to curbings and walls.

Turning now to FIGURE 1, imagine a sphere of unit radius circumscribing a cube having a pair of horizontal surfaces and the concomitant two pairs of vertical surfaces. The sphere will touch the cube at its eight corners, making the diagonals of the cube, which intersect at the center of the sphere, two units in length.

Now imagine three dimetral and mutually perpendicular planes passing through sphere and cube, two being vertical and one horizontal. Each plane is disposed to pass midway between and parallel to a pair of parallel surfaces of the cube, the three planes intersecting the sphere on great circles, pairs of which intersect each other to define top and bottom vertical poles and four equally separated poles lying in a horizontal equatorial plane. Sphere and cube are divided into octants, the cube octants defining smaller cubes with unit diagonals (equal to the radius of the sphere), square surfaces and one corner coinciding with the center of the sphere (and the diagonally opposite corner lying on the sphere's surface). One such cube octant and its spherical projection are shown in FIGURE 1.

Concentrating on one of the upper quarters of a great circle lying in a vertical plane, divide the half of this quarter lying nearer the upper pole into a convenient number of equal parts, e.g., 9 as in the sketch, each segment of arc thus being 5 degrees. Connect the ends of each arc, points A through J in the sketch, by straight lines to form 9 chords of equal length, AB, BC, etc. through IJ in the sketch. Project points A through J radially on the upper surface of the cube by straight lines to the center O of the sphere. They will divide one of the interior straight lines defining a quadrant of the upper surface of the cube into 9 unequal segments, the smallest segment lying closest to the center of the surface and the largest at the edge thereof. The projections on the cube are labeled A′ through J′ in the sketch.

Repeat this process with one of the uppermost octants of the other vertical great circle, the end result being an identical division of the other interior straight line of the same quadrant of the upper surface of the cube. Corresponding lower case letters are used for this second division, and each point in the quadrant is identified by a pair of letters indicating that it lies on a pair of intersecting lines, as B′b′ lies on the lines through B′ and b′, etc.

Divide this upper surface quadrant of the cube by erecting thereon, through the points thus projected on one of the interior quadrant-defining lines, a series of lines passing through such points perpendicular to the same quadrant-defining line, and similarly with respect to the points on the other quadrant-defining line. The lines of each series will, of course, be parallel to each other and to the quadrant-defining line it does not intersect. Each line of one series will intersect the lines of the perpendicular series in a series of 9 additional points (total 81), the net result being a segmentation of the surface area into 81 rectangles of unequal area, the smallest lying at the corner of the quadrant just above the center of the sphere and the largest at the diagonally opposite corner. Only the rectangles bisected by the diagonal joining such corners are square, the remainder being rectangles having unequal intersecting edges.

Project such 81 points on the sphere by radii from the center of the sphere. Thinking of each line on the cube surface being projected on the sphere by a plane passing through the center of the sphere, it is apparent that the intersection of such plane with the spherical surface is a great circle and that the projection of the corresponding points on the cube line will lie on that great circle. Connect adjacent points on each great circle by chords, and the result will be a series of quasi-quadrilaterals completely inscribing 1/24 of the sphere. There will be 81 such quasi-quadrilaterals, most of which approach a square in shape and the dimensions of which are all ready calculable. The same identification is used for identifying interior points within this 1/24 surface, e.g., B$b$ identifies the intersection of the great circles through B and $b$, E$h$ through the intersection of the great circles through E and $h$, etc.

It is apparent from the above described segmentation that a 1/24 portion of the spherical surface has been divided in two directions into 9 strips which are approximately identical except for length. Considering only one set of such strips, e.g., those formed by the great circle lines A—$j$, B—B$j$, C—C$j$, etc., it is apparent that the spherical strips are identical except for length, the arc length being greatest along geodesic line A—$j$ and least along J—J$j$. This characteristic will improve control in cutting rigid material and will permit variation in design through elimination of selected elastic joints so that some panels will have edge lengths equal to the sum of the lengths of two or more of the adjacent quasi-quadrilaterals shown in FIGURE 1. Carried to the extreme, this modification would eliminate all joints along the series of line $b$—J$b$, $c$—J$c$, $d$—J$d$, etc., leaving only the nine strip panels extending from left to right in the figure with elastic joints along the lines B—B$j$, C—C$j$, etc. In such a system, it is preferable that adjacent 1/24 portions be disposed with their strip panels running in the opposite direction to prevent continuous stress transmittal from one side of the dome to another.

Based on the aforementioned unit radius but dividing each octant of the great circles into 5 parts of 9 degrees each (25 panels in the surface), the largest edge dimension is 0.15692 and the smallest is 0.11136. It is also to be noted that, when such quasi-quadrilaterals are used in building a dome from sheet materials cut into panels, only 15 different patterns are required regardless of the fraction of sphere thus inscribed.

The above process is repeated with respect to the other three quadrants of the cube's upper surface, resulting in inscribing the uppermost 1/6 of the sphere, covering an included plane angle of 90 degrees in each of the vertical planes through A—J and A—$j$. It may be repeated with respect to the quadrants of each vertical cube surface above the middle to inscribe the upper hemisphere, or even extend to the lower surface to completely inscribe the sphere.

The panels involved have been referred to above as "quasi-quadrilaterals" because they are not truly plane surfaces. The differences, however, are slight, and panels cut to the calculated edge dimension of the system described, with a proper allowance for joints, may be joined together properly simply by "bowing" each panel slightly across its shorter diagonal. Thus all panels may be prefabricated from flat sheet stock, properly marked for assembly purposes immediately thereafter, and assembled in the field without confusion, bearing in mind that areas of varied size may be covered simply by multiplying each dimension by an appropriate multiplier (unit sphere radius multiplied by so many feet and inches) and fabricating accordingly.

My complete basic dome as above constructed is shown in FIGURES 2 and 3 as a projection of the entire upper surface of an imaginary inscribed cube, i.e., embracing an included planar angle of 90 degrees in the vertical diametral planes passing through A—J and A—$j$ of FIGURE 1, the corresponding geodesic lines of FIGURES 2 and 3 being A—F and A—$f$ because the octants are divided by a frequency of 5 rather than 9. It is to be understood from the above that the partial spherical surface shown in these figures may be increased by repetition of the layout technique outlined above, and in particular that a complete hemisphere may be built up by applying such method to all of the upper halves of the four vertical faces of the imaginary inscribed cube. As a practical matter, the fiction of the inscribed cube can be disregarded once the panels for the upper spherical surface have been laid out, as identical panels will be used in adding to the structures shown. Thus in adding to the FIGURE 2 embodiment along a continuation of great circle line A—F, the first panel added will be identical with panel 15 and will be joined along F—F$b$ to form a mirror image of 15 in F—F$b$, the second panel will be identical with panel 13 and will likewise be disposed to form a mirror image of 13 in F—F$b$, etc. In such manner the structure shown is also enlarged along the complete line F—F$f$, and the process is repeated along lines F$f$—$f$. The other quadrants are similarly added to until the structure shown has been tripled to form a complete hemisphere.

I call particular attention to the fact that the structure shown in FIGURES 2 and 3 can not be regarded simply as a spherical cap, i.e., the portion of a sphere cut off by a lesser plane. This is made clear by the plan view of FIGURE 3, which shows that the plan perimeter is composed of 4 arcs intersecting at the corners to define an area closely approximating a square. Thus this embodiment is ideally suited for covering square ground areas, particularly where some overlap of the area to be covered creates no problems.

It is also to be noted that the FIGURE 2 embodiment may be modified by eliminating one or more outside strips of panels from one or both pairs of sides, providing new curbings to replace those illustrated. If this is done uniformly, e.g., by removing panels 15 and 15', 14 and 14', 12 and 12', 9 and 9', and 5 from all quadrants, the plan perimeter approaches a square plan even more closely, and such squareness becomes more pronounced as the second row of panels is removed from the outside. On the other hand, if one or more rows of panels are removed from only one pair of opposed sides, resulting in a dome having one axial length greater than the other, the modified structure becomes suitable for covering rectangular ground areas. This can be done, e.g., by removing panels 15, 14, 12, 9 and 5 from all four quadrants of the FIGURE 2 embodiment. The dimensions for the new curbings necessitated by such modifications and the dimensions of the modified dome to cover a given shape and size of area are all ready calculable, involving nothing more than well known trigonemetric relationships.

In FIGURES 2 and 3 the diagonals 16 and 17 have been shown in phantom to bring out the symmetry of each surface quadrant and the "plumbness" of such diagonals. Considering the near quadrant of FIGURE 2 (lower left-hand in FIGURE 3), diagonal 16 divides such quadrant into symmetrical octants. Panels 1, 2, 3, 4, and 5, which are bisected by the diagonal, closely approximate squares and have no mates in the balance of the quadrant. Panels 6 and 6', however, have identical dimensions but are disposed symmetrically as mirror images in diagonal 16. The same applies to panels 7 through 15 and 7' through 15', the symmetry being emphasized by the "prime" designation. Thus, as indicated above, only 15 different panel shapes are required for the division of great circles A—F and A—f into 5 equal parts of 9 degrees each, these same 15 panels being used to produce a hemisphere or even a complete sphere.

Each diagonal 16 and 17 shown in FIGURES 2 and 3 is a great circle lying in a vertical plane, and can therefore join directly to a vertical wall of a conventional building to provide a partial dome attached directly to such buildings. Similar connections to vertical walls to provide partial domes may of course by made along any quadrant defining great circle line such as A—F or A—f. Note that by removing one quadrant of the dome the remaining ¾ dome may be connected to an outside corner of a conventional building along both A—F and A—f. Partial basic domes may also be connected along diagonals such as 16 or 17 to the special barrel patterns to be described below.

The four curbings 18, 19, 20 and 21 shown in FIGURES 2 and 3 are identical, though as indicated above they will vary if strips of panels are removed from only one pair of opposed edges. Although such curbings are curved in plan and have a curved upper surface or edge, their dimensions and curvatures are all readily calculable from simple geometric formulae. They are made from any conventional building material such as concrete, wood, steel, etc., and are preferably anchored to the supporting surface by conventional methods. At the upper surface of each curbing a joint is provided with the rigid panels of the dome in a manner to be discussed below in connection with FIGURE 7. Similarly, no attempt has been made to portray the joints between panels in FIGURES 2 and 3 because the scale employed makes it impracticable to bring out such details. It is to be understood that such joints are present in those figures, and are represented by the great circle lines defining the panel edges, the details of such joints likewise being shown in FIGURE 7. One set of joints, represented by great circle lines A, B, C, D, E, etc., intersects the other set of joints, represented by lines b, c, d, e, etc., to form a two-way grid system as shown in FIG. 2. In this system each member of the first set of lines (A, B, C, etc.) is chordedly arcuate and is co-planar with an aixs of revolution. Each member of the second set of lines (b, c, d, e, etc.) is likewise chordedly arcuate with its center (i.e. the center around which the arc extends) lying on said axis and co-planar with a line intersecting and normal to said axis of revolution. By "chordedly arcuate" I mean that the lines formed by the joints between two adjacent panel edges may be substantially straight, approximating the chord of an arc, but the end-to-end sum of many such joints gives a line which is substantially arcuate, such, for example, as a great circle line.

It will be observed that in describing the method of developing my basic dome from a cube, in connection with FIGURE 1, a frequency of 9 was used, i.e., the 45 degree portion of the vertical great circle which also subtends the half length of the inscribed cube was divided into 9 equal arcs of 5 degrees each, whereas in the FIGURE 2 embodiment the same arc is divided into 5 equal parts of 9 degrees each. While such frequency may be varied considerably, there are practical limits which should be considered. A very low frequency, e.g., 2, would result in a dome which does not closely approximate a spherical surface and thus loses the natural advantages of a sphere in dissipating live loads, and would require that enclosures of other than very small areas utilize panels so large as to be manageable only under extreme difficulty and high cost. On the other hand, a too high frequency not only increases the design complexity and the number of different panels necessary to construction but decreases the angle at which adjacent panels join, thereby weakening the structure by reducing the characteristic of hinges locked in opposition to each other, a feature essential to the use of the elastic joint and the elimination of struts and braces. My own preference is for a frequency in the neighborhood of 5, as shown in FIGURES 2 and 3, as the best compromise affording both good hinge action and a close approximation to a spherical surface.

It will be noted from the above description that my basic dome defines a substantially spherical surface. All panel edges and joints follow geodesic lines, and the actual lines defined by edges and joints depart from a truly spherical contour only in that the edges of the rigid panels define chords rather than arcs. Thus my basic dome makes the maximum practical use of the spherical shape and thereby gains the strength of such shape and its ability to dissipate loads.

Although as indicated above my basic dome can be modified to cover rectangular areas rather closely, an alternate embodiment provides greater latitude in accomplishing such end. This embodiment, which I prefer to call a "barrel" dome because its shape is somewhat similar to that of a barrel, is illustrated perspectively in FIGURE 4. In this embodiment, there is typically an elongated dimension along axis 41 and all cross sections normal to such axis are circular or, more accurately, near circles defined by a series of chords of equal length connected end to end. The rigid panels are connected by two series of elastic joints, one following such a chorded circle system to provide cross-sectional joints such as 42 and 43. The other series of elastic joints such as 52 and 53 (and the corresponding panel edges) are arcuate and extend longitudinally along the surface of the dome. Such arcuate joints are preferably all equal in length, segmentation, and spacing, with the result that all panels proceeding circularly around the dome between any adjacent pair of circular joints are identical in shape, size and dimensions. This embodiment may be thought of as one generated by revolving about axis 41 a portion of a chorded arc, the arc having a center which does not necessarily lie in the axis of revolution. The chords are preferably equal in length and the curvature is away from the axis to obtain the benefit of presenting a convex surface to natural forces. The layout scheme may be completed to obtain my barrel dome by passing through axis 41 a series of equally spaced planes. Such planes will intersect the generated curve to define the series of joints 52 through 60, and the panel edge widths are then determined as the chords of the cross sectional circles between adjacent knees or nodes of the longitudinal joints, e.g., between 52 and 53 along joint 42.

Although various design methods are possible, I prefer, for the purpose of reducing the number of calculations, to use a standard longitudinal strip of panels—a "stave"—which is repeated to form other staves of the same barrel dome and which may be used to form barrel domes of larger or smaller beam by increasing or decreasing the number of staves. Thus I have calculated and employed a basic barrel design which, when used repetitively 40 times as staves, i.e., repeated segments joined to each other along longitudinal joints to form a complete dome around the axis 41, will define a true spherical surface (chorded) of maximum radius of unity with a cross sectional chord length at such maximum radius of 0.15692, the length of chord subtended by a 9 degree chord of a unit radius sphere, as shown in FIGURE 2 at the vertical great circles bisecting the inscribed cube between parallel surfaces. This basic barrel pattern has been calculated with the same chord length (0.15692) for the equal longitudinal chords, thus making the panels 65, 65', 65", etc., adjacent maximum cross section 47 very nearly square in shape, and successive longitudinal panels very nearly square but slowly elongating in the longitudinal direction. Each cross sectional chord of the panels of this basic pattern in a barrel consisting of 40 basic patterns subtends the 9 degree central angle necessary to define a spherical surface.

It can be seen from the above that the 40-stave barrel described may be joined at joint 47 (or 51) to a half of the basic dome shown in FIGURES 2 and 3 at the maximum (unity) radius of the former and one of the joints of the latter along A—F or A—f. This type of joint is particularly useful in joining a dome to a vertical wall of an existing building at any cross-sectional joint of the barrel section. At the joint between the geodesic half dome and the barrel half dome, both sections flow away from the joint normally with the same curvature, and no support is required at the joint.

The same basic pattern used with the 40-stave barrel described above may be used with barrel domes having more staves or less staves, the result of the first being an oblate spheroidal dome and of the second a prolate spheroidal dome. It is the latter type which is illustrated in FIGURE 4, where the number of staves to form a complete barrel dome (360 degrees) is 16. The basic pattern mentioned above is shown in panels 61, 62, 63, 64 and 65, this pattern being repeated in the correspondingly identical panels 61', 62', 63', 64' and 65' and successive adjacent strips. To the right of maximum beam circumferential joint 47, this pattern has been repeated as far as circumferential joint 49, in panels 65R and 64R, 65'R and 64'R etc., 65R being a mirror image of 65 in a vertical plane through joint 47, etc. Thereafter in proceeding to the right, the beam is increasing rather than decreasing, so that panel 64L is identical in shape, dimension and disposition (except for a linear displacement parallel to 41) with panel 64, panel 65L is similarly identical with panel 65, etc. Attention is directed to the fact that support is required at joint 49, as indicated in FIGURE 4 by curbing 67, as well as at the ends, indicated by curbings 66 and 68.

No longitudinal curbing is shown for the barrel dome of FIGURE 4, as the half barrel shown has horizontal peripheral edges. It will be readily appreciated that support or "tie-down" is required, and that such structure must follow the curvature of the curve used to generate the dome. The joint to such structure is similar to that used to join the FIGURES 2–3 embodiment to its curbing, as are the joints between panels, and described below in connection with FIGURE 7.

FIGURE 5 illustrates in a perspective view another variation of my invention, one which I prefer to call a "special barrel section" or a "section for joining in two directions." In this figure I have shown the geodesic planes determining the chorded panel edges and joints of the dome surface, rather than the panel surfaces proper, to emphasize the design method of my invention. It will be understood, of course, that no such planes or walls are required and that the dome is still one composed of quadrilateral panels of thin, rigid material disposed adjacent each other and connected by elastic joints. The special barrel section is shown as that octant appearing as the right portion of this figure, i.e., to the right of diagonal 71. The portion to the left of such diagonal is an octant of my basic geodesic dome shown in FIGURES 2 and 3 and described above. The special barrel pattern is slightly less than an octant of the ⅛ of a sphere (¹⁄₄₈ of a complete sphere) shown in FIGURES 2 and 3, and is designed to match with my basic geodesic dome in such manner that the peripheral edge of the pattern or section provides a flat vertical curbing which will meet and match exactly with the vertical surface of a conventional building or a straight line boundary of a ground area.

In considering the special barrel pattern of FIGURE 5, I call attention first of all to the fact that surface lines 72, 73, 74 and 75 are continuations of the geodesic lines 78, 79, 80 and 81 of the basic dome octant shown therein, surface line 76 being a geodesic line normal to A—F, whereas lines 82, 83, 84, 85 and 86 are lesser circle lines defined by lesser planes parallel to each other and the geodesic plane through A—F and intersecting diagonal 71 at points 87, 88, 89, 90 and F—f, respectively. The lesser circle lines of the special barrel pattern still define a spherical (chorded) surface, with all its attendant advantages, but depart from the FIGURE 2–3 embodiment in that one set of surface grid lines are defined by lesser circles rather than geodesic lines, and depart from the FIGURE 4 embodiment in that the spacing between successive lesser circles is determined by passing the lesser circles through the intersections of the diagonal with the geodesic lines of the basic dome rather than to conform with uniform chord lengths between adjacent lesser circles.

In considering FIGURE 5, note that the edge lengths between adjacent joints such as 72 and 73, 73 and 74, 74 and 75, etc., along any lesser circle panel such as 85 are equal, a state of affairs resulting from the geometry of the construction and one which greatly simplifies the layout of the panels in the shop.

FIGURE 6 demonstrates the utility of the special barrel patterns described above in joining to the flat vertical walls of existing buildings and in covering square and rectangular surfaces. FIGURE 6 shows in plan a dome formed of four of my basic dome sections (octants) 91, 92, 93 and 94, as shown above in FIGURES 2 and 3, and four of my special barrel sections 95, 96, 97 and 98 as shown above in FIGURE 5. In this combination barrel section 95 is identical with the special barrel section of FIGURE 5 while special barrel section 96 is the mirror image of 95 in line 99 and special barrel section 97 and 98 are identical with 95 and 96, respectively. Note that in such embodiment the two parallel peripheral edges 100 and 101 lie in parallel vertical planes, thus making it possible to span precisely an area of ground between the two parallel walls of a pair of existing buildings separated by a vacant lot. Where it is only desired to join one conventional vertical wall, it is preferable to use only one pair of special barrel sections, replacing, e.g., 95 and 96 with a pair of basic dome sections identical with 92 and 91, respectively. Note that it is also possible to replace basic dome sections 91 and 92 with sections identical to special barrel sections 96 and 95, and similarly to replace 93 and 94 with special barrel sections, thus covering precisely and without overlap a completely square ground area. By modification of such a completely square dome, rectangular ground areas may also be spanned without overlap, as by omitting a row of panels along each of a pair of opposed peripheral edges, e.g., panels along edges 100 and 101 of FIGURE 6 as modified. In any construction such as that shown in FIGURE 6 or the modifications mentioned, it is of course possible to enclose larger areas by building on more special barrel sections along any edge such as 100 or 101, e.g., a duplicate of the FIGURE 6 structure may be added at edge 100 by matching edge 101 of the duplicate with edge 100 of the original. It is to be noted that such a structure requires support at the common joint.

In FIGURE 7, divided into parts a through d, I have attempted to show the various means whereby my rigid panels and elastic joints are connected, and also how my rigid panels are connected to curbings.

As indicated in FIGURE 7a, the simplest method of connection is through a joint 140 in the form of an H strip defining a web 141, into which the panels P1 and P2 are preferably butted, and tapered legs 142 and 143. Such joining strips are preferably cut to correspond with the lengths of individual panel edges, the corner gaps between abutting strips being filled in with caulking material; alternatively, joining strips are extended in one direction and the amount of caulking material correspondingly reduced. Other means of joining the panel edges are, of course, feasible, the important point being that the elastic material of the joint, e.g., rubber, neoprene or the like, be firmly cemented to the rigid panel material, e.g., steel, other metals, wood, plastic or the like. The transparent plastics such as Lucite are especially preferred for the panels because they combine strength with translucency.

It will be apparent from FIGURES 7b and 7c that the curbing will include either a pocket 144 of resilient elastic material imbedded in the curbing for joining with the rigid material of the dome panel P, or, as shown in FIGURE 7c, a rigid material member 145 similar to that of the panel joining to such panel by one of the cemented elastic H-type joints 140 above described. Either will provide an elastic joint between dome and curbing, the latter being preferred for obvious maintenance reasons. FIGURE 7d shows a modification suitable for joining a dome panel P to a vertical curbing or wall C through an elastic joint 140 and an L-shaped rigid member 146 secured to such curbing or wall.

Thus I have described above a system of dome construction which is independent of the usual trusses or equivalent supporting members, is substantially spherical in form, and is projected from very simply geometrical shapes to cover square, nearly square, or rectangular ground areas. Modifications thereof are joinable directly to vertical walls, as are modifications of the basic design. There is no known limit to the size of my domes, diameters up to 40 feet being practicable with plywood of ½" thickness and joints of neoprene in a 1" thickness to obtain the structures described which will hold up under the usual range of weather conditions in a temperate climate.

Although there are various practical ways of erecting my domes, I prefer to start by joining one row of panels to one curbing, concurrently attaching and cementing the connecting elastic joints. The free edge is then aligned to the approximate true curve by means of temporary struts or tie-downs. A second row of panels is then joined in a similar manner, moving struts and tie-downs to the new free edge. Successive rows of panels are joined in a like manner until the dome is completed. The last panel (shown as 15 in FIGURE 2) must be forced into position in the manner of fitting a tire onto a rim.

The specific embodiments of my invention and the variations thereof described above are not intended in a limiting sense, it being understood that my invention is limited only by the following claims.

What is claimed is:

1. A building dome having at least one axis of revolution comprising a multiplicity of bowed, thin, rigid quadrilateral panels, said panels being disposed adjacent one another with their edges substantially parallel to the edges of adjacent panels but spaced therefrom by a gap, and a system of elastic joints connecting said adjacent edges and filling said gaps, said elastic joints being formed by rubbery strips firmly secured to the bowed, rigid panels along adjacent edges thereof and being connected to define a two-way grid system of intersecting sets of lines, each set of lines consisting of a plurality of members, in which system each member of one set of lines is chordedly arcuate and is coplanar with said axis and each member of the other set of lines is chordedly arcuate with its center lying on said axis and is coplanar with a line intertersecting and normal to said axis of revolution, each chorded arc thus defined presenting its concave side to said axis.

2. The building dome of claim 1 in which each of said other set of lines defined by said elastic joints is coplanar with a separate line normal to said axis, said other set of lines thus lying in a series of separated parallel planes normal to said axis.

3. The building dome of claim 2 in which the chord length in each of said one set of grid lines between adjacent members of said other set of grid lines are equal and the chord lengths in each of said other set of grid lines proceeding around said axis are equal.

4. The building dome of claim 1 in which each of said other set of grid lines defined by said elastic joints is coplanar with the same line normal to and intersecting said axis and each of said one set of grid lines has a center lying on said axis, thereby defining a spherical surface in which all of said elastic joints are chorded arcs of geodesic circles.

5. The building dome of claim 1 wherein the rubbery strips are firmly and permanently secured to the edges of the bowed, rigid panels by being cemented thereto.

6. The building dome of claim 4 in which any one of said one set of grid lines consists of a number of chords of equal length and said length is common to the chords of that of said other set of grid lines lying in a plane normal to both said axis and to the plane containing said any one of said one set of grid lines.

7. The building dome of claim 6 in which the uniform chord length chosen for said one of said set of grid lines is that subtending at the center of said spherical surface, in its geodesic plane, an angle determined by dividing 45 degrees by a frequency in the range of from 3 to 15, including fractions.

8. The building of claim 7 in which said frequency is 5.

9. The building of claim 7 in which said frequency is 9.

10. The building of claim 7 in which said frequency is 4½.

11. A building dome of substantially spherical surface comprising a multiplicity of bowed, rigid quadrilateral panels each edge of which lies substantially on the surface of a common sphere and a system of elastic joints connecting said panels at their edges, said elastic joints comprising rubbery strips with their outer portions firmly secured to edges of adjacent panels and their mid-portions disposed in gaps between said edges of adjacent panels, and said joints being in a first set of chordedly arcuate lines and in another set of chordedly arcuate lines which intersect the lines in the first set and thereby define a grid, said dome being defined by the projection on said spherical surface of at least a portion of at least the supper surface of an imaginary horizontal cube inscribed in said sphere and said quadrilateral panels being defined by the segmentation of said spherical surface by a first set of geodesic planes passing through one horizontal axis of said cube and intercepting equal arcs on a great circle orthogonal to said axis and a second set of geodesic planes passing through the other horizontal axis of said cube to intercept equal arcs on a great circle orthogonal to said second axis equal to the first defined set of arcs.

12. The method of constructing a building dome from flat sheet stock, which method comprises cutting said sheet stock into thin, rigid, quasi-quadrilateral panels of calculated edge dimensions to obtain a number of different patterns of size and shape corresponding to projections on a sphere of intersecting lines on a face of an inscribed cube, marking the panels for assembly purposes, securing the outer edges of a peripheral row of panels to a supporting wall by an elastic joint, securing adjacent edges by elastic joints while holding said edges aligned by bowing said panels, and similarly joining additional rows of panels until the dome is completed, the dimensions of the panels being such as to leave a gap between adjacent panel edges and the elastic joint between said panel edges being formed by interposing the mid-portion of a rubbery strip between adjacent panel edges and firmly securing the outer sides of the strip to said panel edges.

13. The method of claim 12 wherein the outer sides of the rubbery strip are firmly and permanently secured to the panel edges by cementing said sides to said edges.

References Cited in the file of this patent

UNITED STATES PATENTS

| 2,918,151 | Kennedy | Dec. 22, 1959 |

FOREIGN PATENTS

| 814,505 | France | Mar. 22, 1937 |
| 1,002,262 | France | Oct. 31, 1951 |
| 1,006,006 | France | Jan. 9, 1952 |
| 817,995 | Great Britain | Aug. 12, 1959 |

OTHER REFERENCES

Bonatz, German application, No. W 13744 v/37a (Kl 37a Gp6, published Mar. 29, 1956.

Bienhuls German application 1,042,502, printed Nov. 6, 1958 (Kl 5c 9/01).